US008859978B2

(12) United States Patent
Senda et al.

(10) Patent No.: US 8,859,978 B2
(45) Date of Patent: *Oct. 14, 2014

(54) RADIATION IMAGE PICKUP DEVICE

(71) Applicant: Sony Corporation, Tokyo (JP)

(72) Inventors: Michiru Senda, Kanagawa (JP);
Tsutomu Tanaka, Kanagawa (JP);
Tsutomu Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,114

(22) Filed: Nov. 5, 2013

(65) Prior Publication Data

US 2014/0061484 A1 Mar. 6, 2014

Related U.S. Application Data

(63) Continuation of application No. 13/137,209, filed on Jul. 28, 2011, now Pat. No. 8,618,492.

(30) Foreign Application Priority Data

Aug. 25, 2010 (JP) ................................. 2010-188100

(51) Int. Cl.
*G01T 1/24* (2006.01)
*H04N 5/32* (2006.01)
*G01T 1/208* (2006.01)
*H04N 5/365* (2011.01)

(52) U.S. Cl.
CPC *G01T 1/247* (2013.01); *H04N 5/32* (2013.01); *G01T 1/208* (2013.01); *H04N 5/3651* (2013.01)
USPC .................................................... 250/370.09

(58) Field of Classification Search
USPC ....................................................... 250/370.09
See application file for complete search history.

(56) References Cited

U.S. PATENT DOCUMENTS 6,393,098 B1 * 5/2002 Albagli ......................... 378/98.2
6,854,885 B2 * 2/2005 Wischmann et al. .......... 378/207

(Continued)

FOREIGN PATENT DOCUMENTS

JP 07-072256 3/1995
JP 11-307756 11/1999

(Continued)

OTHER PUBLICATIONS

Japanese Office Action issued Apr. 2, 2014 for corresponding Japanese Application No. 2010-188100.

*Primary Examiner* — David Porta
*Assistant Examiner* — Taeho Jo
(74) *Attorney, Agent, or Firm* — Rader, Fishman & Grauer PLLC

(57) ABSTRACT

A radiation image pickup device includes: an image pickup section having a plurality of pixels and generating an electric signal according to incident radiation, the plurality of pixels each including a photoelectric conversion element and one or a plurality of transistors of a predetermined amplifier circuit; and a correction section subjecting signal data of the electric signal obtained in the image pickup section to predetermined correction process. The correction section makes a comparison between measurement data obtained by measuring an input-output characteristic of the amplifier circuit in each of the plurality of pixels and initial data on the input-output characteristic, and performs the correction process by the pixel individually, by using a result of the comparison.

18 Claims, 14 Drawing Sheets

(56) References Cited

U.S. PATENT DOCUMENTS

| | | | |
|---|---|---|---|
| 6,911,996 B1* | 6/2005 | Takemoto | 348/61 |
| 7,026,608 B2* | 4/2006 | Hirai | 250/252.1 |
| 7,476,027 B2* | 1/2009 | Takenaka et al. | 378/207 |
| 7,532,706 B2* | 5/2009 | Kameshima et al. | 378/98 |
| 7,560,682 B2* | 7/2009 | Hoernig | 250/208.1 |
| 7,573,038 B2* | 8/2009 | Yokoyama et al. | 250/370.09 |
| 2005/0206764 A1 | 9/2005 | Kobayashi et al. | |
| 2008/0094489 A1* | 4/2008 | Takamoto | 348/241 |
| 2009/0001276 A1* | 1/2009 | Yagi et al. | 250/370.09 |
| 2010/0001198 A1* | 1/2010 | Yagi et al. | 250/370.09 |

FOREIGN PATENT DOCUMENTS

| | | |
|---|---|---|
| JP | 2001-141832 A | 5/2001 |
| JP | 2003-284707 A | 10/2003 |
| JP | 2004-053584 A | 2/2004 |
| JP | 2007-282684 | 11/2007 |

* cited by examiner

RADIATION IMAGE PICKUP DEVICE

CROSS REFERENCES TO RELATED APPLICATIONS

The present application is a Continuation application of Ser. No. 13/137,209, filed on Jul. 28, 2011, and claims priority based on Japanese Patent Application No. 2010-188100, filed on Aug. 25, 2010, the entire contents of which are incorporated herein by reference.

BACKGROUND

The present disclosure relates to a radiation image pickup device subjecting radiation represented by α-rays, β-rays, γ-rays, and X-rays to wavelength conversion, thereby reading information based on the radiation.

In a radiation image pickup device (radiation reader), electric charge based on input information after being subjected to photoelectric conversion in a photoelectric conversion section (photoelectric conversion element) is converted into a signal voltage, and thereby reading (imaging) of information based on radiation (for example, α-rays, β-rays, γ-ray, X-rays, or the like) is carried out.

When an image pickup section is configured by arranging a plurality of pixels, the interconnection length of a signal line to read a signal from the pixel increases according to a pixel number and thus, large parasitic capacitance may be formed. In that case, due to this large parasitic capacitance, an output voltage read from the signal line drops significantly.

Further, in such a situation, in order to perform moving-image reading, it is desirable to have sensitivity allowing image reading of, for example, about 30 sheets per second, and rapidity of movement. In particular, in a non-destructive inspection or the like including X-ray diagnosis in the medical care, there is a demand for reduction of an X-ray dose in irradiation and thus, higher sensitivity is desired.

Therefore, a typical radiation image pickup device has such a configuration that a source follower circuit that reads a signal voltage corresponding to signal charge into a signal line is provided for every pixel (for example, see Japanese Unexamined Patent Application Publication No. 11-307756). According to this source follower circuit, high-speed signal reading is possible even when capacitance formed in the signal line is large.

SUMMARY

In a radiation image pickup device including this type of source follower circuit, each pixel is provided with a field effect transistor (FET) included in the source follower circuit and a PIN photodiode serving as a photoelectric conversion element. Of these, the field effect transistor has a semiconductor layer (channel layer) made of microcrystalline silicon or polycrystalline silicon.

However, in such a radiation image pickup device, there is such a disadvantage that due to irradiation of a measuring object with X-rays, a crystal defect takes place in the semiconductor layer of the field effect transistor, as well as near an interface between the semiconductor layer and a gate insulating film or an interlayer insulating film, or an electric charge is injected into the gate insulating film. When such a crystal defect or the injection of the electric charge into the insulator occurs, the threshold of the transistor changes (shifts), or mobility deteriorates and as a result, the operating point of the transistor fluctuates, and the input-output characteristic of the source follower circuit changes (varies) accordingly. As a result, in the radiation image pickup device in this case, accurate photoelectric conversion (imaging) of radiation corresponding to incident energy may not be performed (degradation in information reading performance occurs), which is disadvantageous.

Thus, for the purpose of suppressing such a fluctuation in the input-output characteristic of the source follower circuit in the pixel due to the application of radiation, Japanese Unexamined Patent Application Publication No. 2007-282684, for example, has proposed a technique of adjusting the power supply voltage of a photoelectric conversion element and a source follower circuit in a pixel.

However, in the technique of Japanese Unexamined Patent Application Publication No. 2007-282684, performing such adjustment of the power supply voltage is common to all pixels and thus, only the same (collective) correction process is performed for all pixels. Therefore, for example, a partial (local) change in input-output characteristic within an image pickup section may not be addressed and thus, suggestion of a technique with more effective measures is expected.

In view of the foregoing, it is desirable to provide a radiation image pickup device capable of effectively suppressing degradation in information reading performance caused by a fluctuation in element characteristic within a pixel.

According to an embodiment of the present disclosure, there is provided a radiation image pickup device including: an image pickup section having a plurality of pixels and generating an electric signal according to incident radiation, the plurality of pixels each including a photoelectric conversion element and on or a plurality of transistors of a predetermined amplifier circuit; and a correction section subjecting signal data of the electric signal obtained in the image pickup section to predetermined correction process. The correction section makes a comparison between measurement data obtained by measuring an input-output characteristic of the amplifier circuit in each of the pixels and initial data on the input-output characteristic, and performs the correction process by the pixel individually, by using a result of the comparison.

In the radiation image pickup device according to the embodiment of the present disclosure, in each of the pixels in the image pickup section, the electric signal is generated according to the incident radiation, and the signal data is obtained. Further, the comparison is made between the measurement data obtained by measuring the input-output characteristic of the amplifier circuit in each of the pixels and the initial data on this input-output characteristic, and the signal data is subjected to the correction process by using the result of the comparison. As a result, even when a characteristic change of the transistor in the pixel occurs due to application of the radiation, a fluctuation in the input-output characteristic of the amplifier circuit in the pixel in response to such a characteristic change (an element characteristic change) is suppressed. Furthermore, performing such correction process by the pixel individually makes it possible to address, for example, a partial (local) change in the input-output characteristic within the image pickup section and thereby, a fluctuation in the input-output characteristic of the amplifier circuit is suppressed more accurately.

According to the radiation image pickup device in the embodiment of the present disclosure, the comparison is made between the measurement data obtained by measuring the input-output characteristic of the amplifier circuit in each of the pixels and the initial data on this input-output characteristic, and the signal data of the electric signal generated according to the incident radiation is subjected to the correction process by the pixel individually, by using the result of the comparison. Therefore, for example, irregularities in reading the radiation among the pixels may be reduced, making it possible to suppress degradation in information reading performance caused by an element characteristic change in the pixel, effectively.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve for explaining the principles of the technology.

DETAILED DESCRIPTION OF EMBODIMENT

An embodiment of the present disclosure will be described below in detail with reference to the drawings. The description will be provided in the following order.

1. Embodiment (an example of a method of correcting signal data using initial data and measurement data)
2. Modifications (other pixel-circuit configurational example, etc.)

Embodiment (Configuration of Radiation Image Pickup Device 1)

Figure 1:
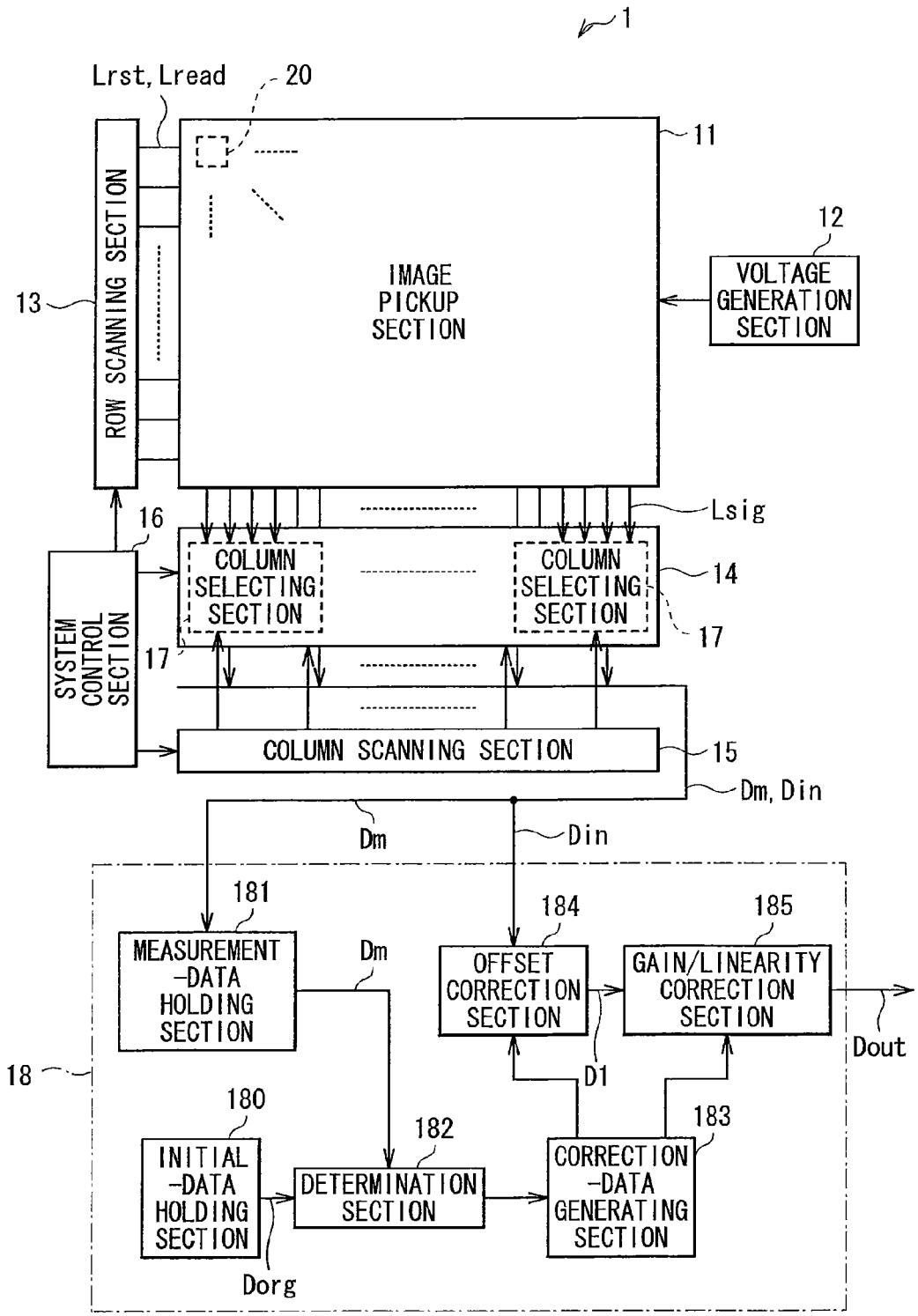
FIG. 1 is a block diagram illustrating an example of an overall configuration of a radiation image pickup device according to an embodiment of the present disclosure.

FIG. 1 illustrates an overall block configuration of a radiation image pickup device (a radiation image pickup device 1) according to an embodiment of the present disclosure. The radiation image pickup device 1 is a device in which radiation represented by α-rays, β-rays, γ-rays, and X-rays is subjected to wavelength conversion, and thereby information based on the radiation is read (imaged). This radiation image pickup device 1 includes an image pickup section 11, a voltage generation section 12, a row scanning section 13, an A/D conversion section 14, a column scanning section 15, a system control section 16, and a correction section 18.

(Image Pickup Section 11)

The image pickup section 11 is an image pickup region provided on a substrate made of, for example, an insulating material such as glass, and produces an electric signal according to incident radiation. In this image pickup section 11, pixels (imaging pixels, or unit pixels) 20 are two-dimensionally arranged in rows and columns (in the form of a matrix), and each of the pixels 20 has a photoelectric conversion section (a photoelectric conversion element 21 to be described later) that produces photoelectric charges in an amount according to a light quantity of the incident light, and accumulates the photoelectric charges inside. The configuration of this pixel 20 will be described later in detail (FIG. 3).

Figure 2:
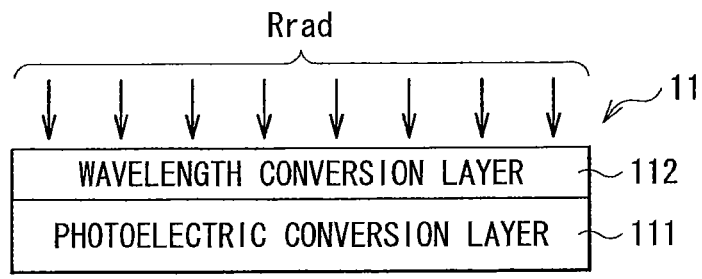
FIG. 2 is a schematic structural diagram of an image pickup section illustrated in FIG. 1.

FIG. 2 illustrates a schematic configurational example of the image pickup section 11. In the image pickup section 11, a wavelength conversion layer 112 is provided on a photoelectric conversion layer 111 (a light receiving side of the image pickup section 11) where the above-mentioned pixels 20 are arranged in rows and columns.

The wavelength conversion layer 112 subjects radiation Rrad (α-rays, β-rays, γ-rays, X-rays, or the like) to wavelength conversion into a sensitivity range of the photoelectric conversion layer 111, and thereby in the photoelectric conversion layer 111, it is possible to read information based on this radiation Rrad. This wavelength conversion layer 112 is made of, for example, a fluorescent substance (for example, scintillator) that converts radiation such as X-rays into visible light. Such a wavelength conversion layer 112 is obtained, for example, by forming a planalizing film made of an organic planalizing film, a spin-on-glass material, or the like, on the photoelectric conversion element 21 to be described later, and forming a phosphor film made of CsI, NaI, $CaF_2$, or the like thereon.

Figure 3:
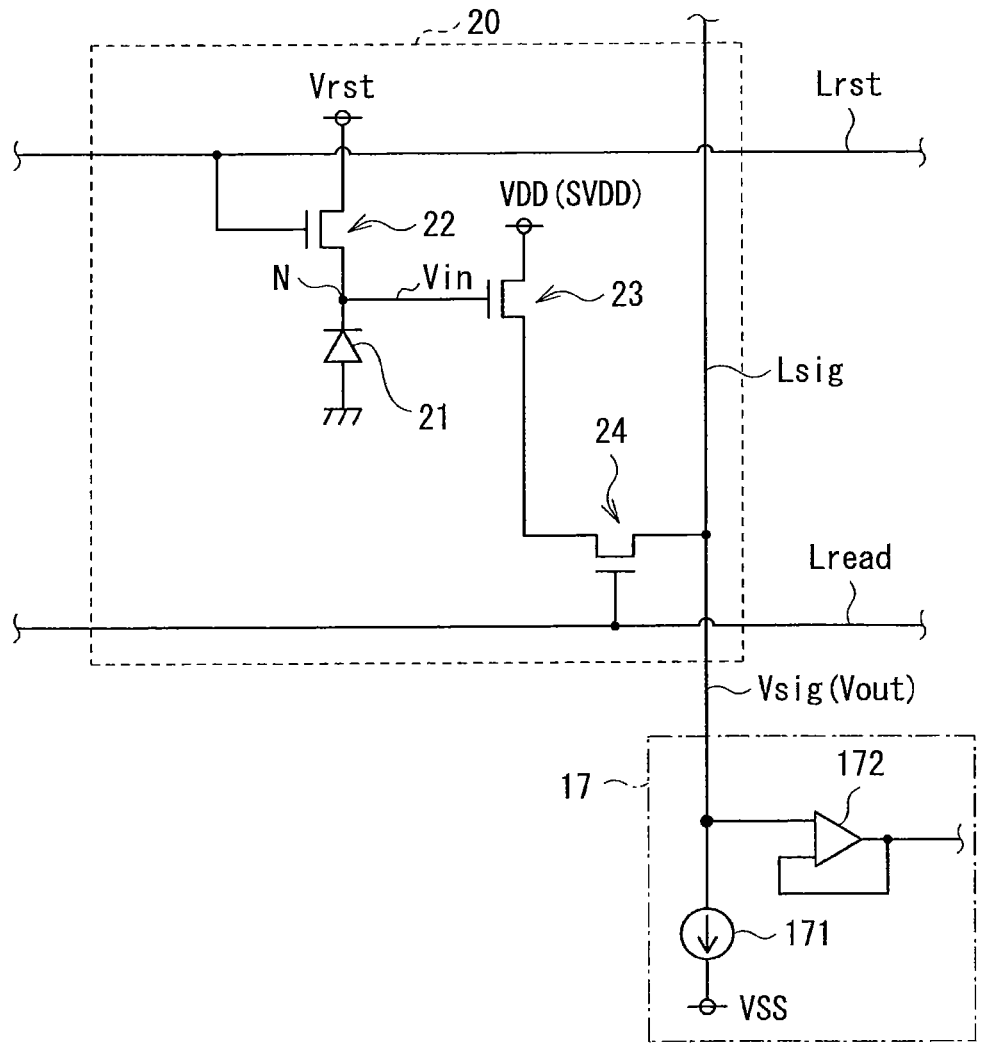
FIG. 3 is a circuit diagram illustrating an example of a detailed configuration of a pixel illustrated in FIG. 1, together with a column selecting section.

FIG. 3 illustrates an example of the circuit configuration of the pixel 20, together with a part of a column selecting section 17 in the A/D conversion section 14 to be described later. The pixel 20 is provided with one photoelectric conversion element 21 and three transistors 22, 23, and 24. Further, to this pixel 20, a reset control line Lrst and a reading control line Lread extending in a row direction (a horizontal direction), and a signal line Lsig extending in a column direction (a vertical direction) are connected.

The photoelectric conversion element 21 is a PIN (Positive Intrinsic Negative) photodiode, and configured to produce signal charge in an amount according to a light quantity of incident light. It is to be noted that a cathode of this photoelectric conversion element 21 is connected to a storage node N.

The transistor 22 is a transistor (a reset transistor) that resets (initializes) the electric potential of the above-mentioned storage node N to a predetermined reset voltage Vrst, by entering the ON state in response to a reset signal supplied from the reset control line Lrst. In other words, this reset voltage Vrst is a voltage used when an input voltage Vin from the photoelectric conversion element 21 is reset. The transistor 23 is a transistor to receive the signal charge (the input voltage Vin) produced in the photoelectric conversion element 21 at a gate, and output a signal voltage according to this signal charge. The transistor 24 is a transistor that outputs a signal (a signal voltage Vsig (an output voltage Vout)) outputted from the transistor 23 to the signal line Lsig, by entering the ON state in response to a row scanning signal supplied from the reading control line Lread.

These transistors 22, 23, and 24 are each configured by using, for example, an N-channel field effect transistor (FET). However, the conductive type of combination in these transistors 22, 23, and 24 is merely an example, and not limited to the above-described combination. Further, these transistors 22, 23, and 24 are made by using, for example, a silicon system semiconductor such as microcrystalline silicon or polycrystalline silicon. Alternatively, an oxide semiconductor such as indium gallium zinc oxide (InGaZnO) or zinc oxide (ZnO) may be used. The microcrystalline silicon, the polycrystalline silicon (polysilicon), and the oxide semiconductor have high mobility μ, compared to amorphous silicon and thus enables high-speed reading of signal by the transistor 23 in particular.

In this pixel 20, of the transistor 22, a gate is connected to the reset control line Lrst, a source is connected to be the reset voltage Vrst, and a drain is connected to a cathode of the photoelectric conversion element 21 and the gate (the storage node N) of the transistor 23. An anode of the photoelectric conversion element 21 is connected to the ground (grounded). Of the transistor 23, a source is connected to a power source VDD (connected to be a power source voltage SVDD), and a drain is connected to a drain of the transistor 24. Of the transistor 24, a gate is connected to the reading control line Lread, and a source is connected to the signal line Lsig. It is to be noted that a constant current source 171 in the column selecting section 17 to be described later is connected to one end of this signal line Lsig.

Here, a source follower circuit (an amplifier circuit) is configured by using the transistors 23 and 24 and the constant current source 171. In other words, these transistors 23 and 24 are each equivalent to a specific example of the "transistor" in the embodiment of the present disclosure. This source follower circuit is a circuit performing predetermined impedance transformation, and is configured to output the signal voltage Vsig as the output voltage Vout to the signal line Lsig. In other words, this source follower circuit is a circuit that converts electric charge into a voltage. Here, in the source follower circuit, input impedance is high and thus, it is possible to convert electric charge stored in a minute storage capacitor like a sensor into a voltage. On the other hand, output impedance is low and thus, it is possible to drive a large load connected to an output side. Such a source follower circuit enables high-speed signal reading even when a capacity formed in the signal line Lsig is large.

Figure 7:
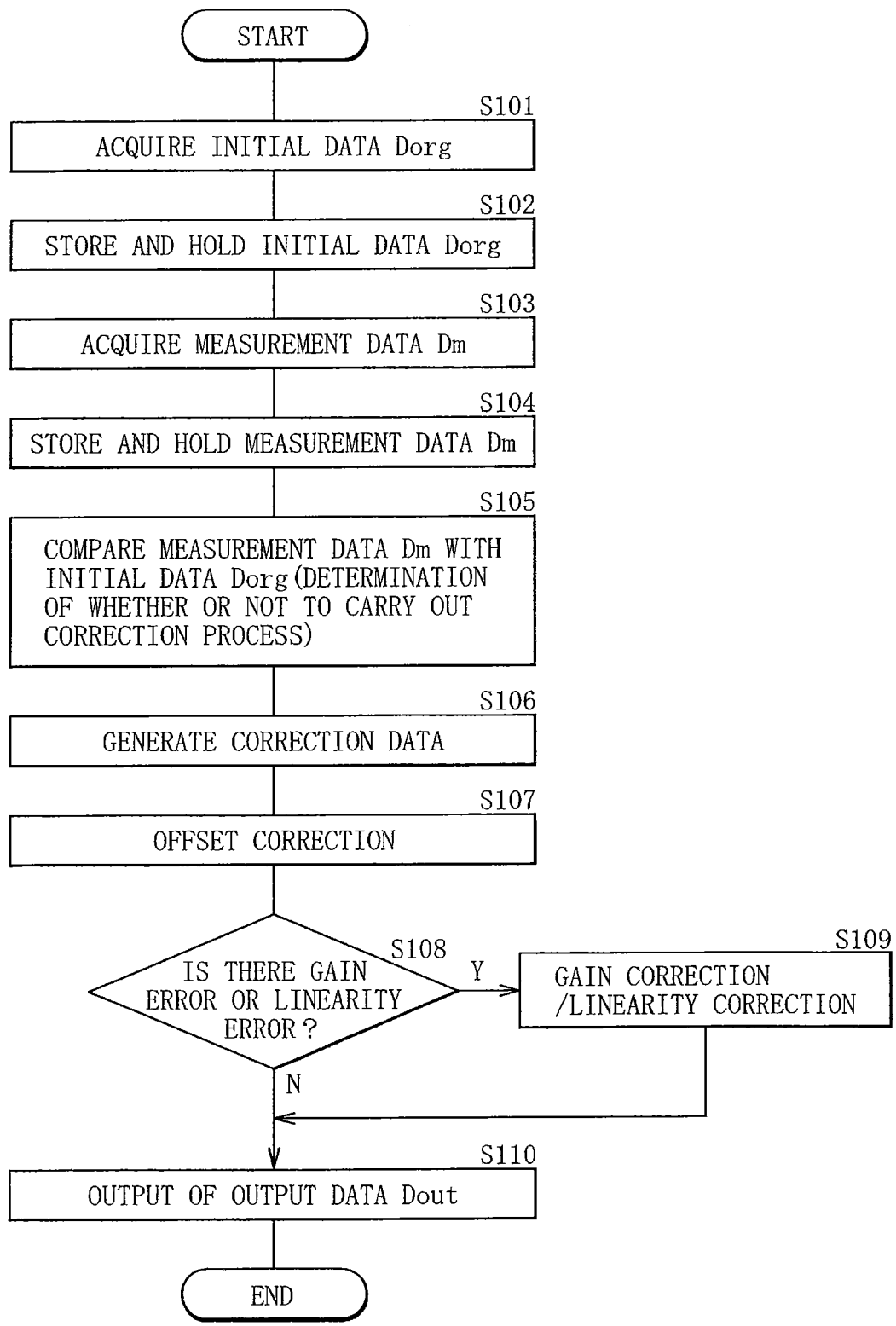
FIG. 7 is a flowchart illustrating an example of a method of correcting signal data according to the present embodiment.
Figure 8:
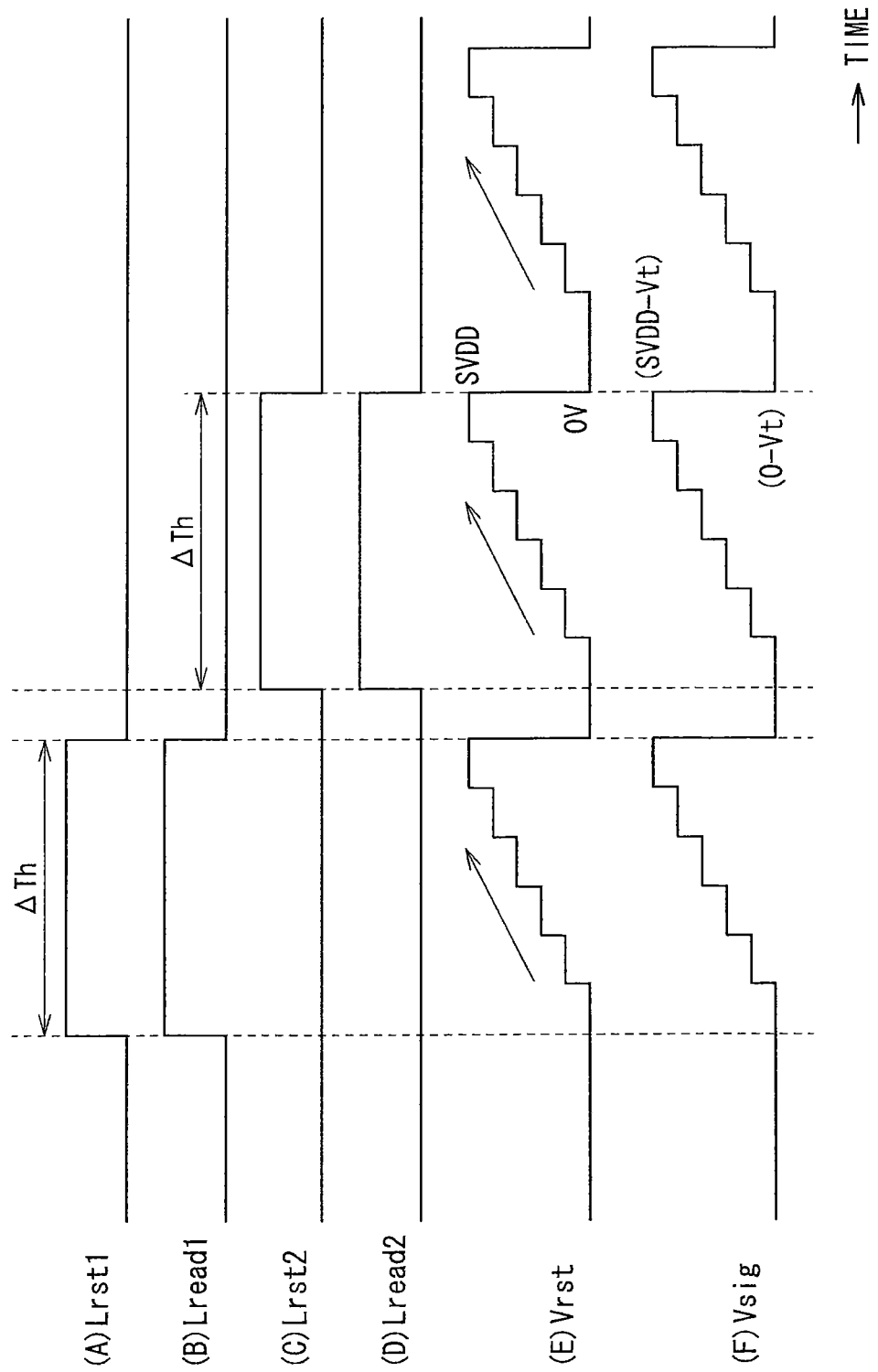
FIG. 8 is a diagram illustrating a first method of acquiring initial data and measurement data, in a timing waveform chart.
Figure 9:
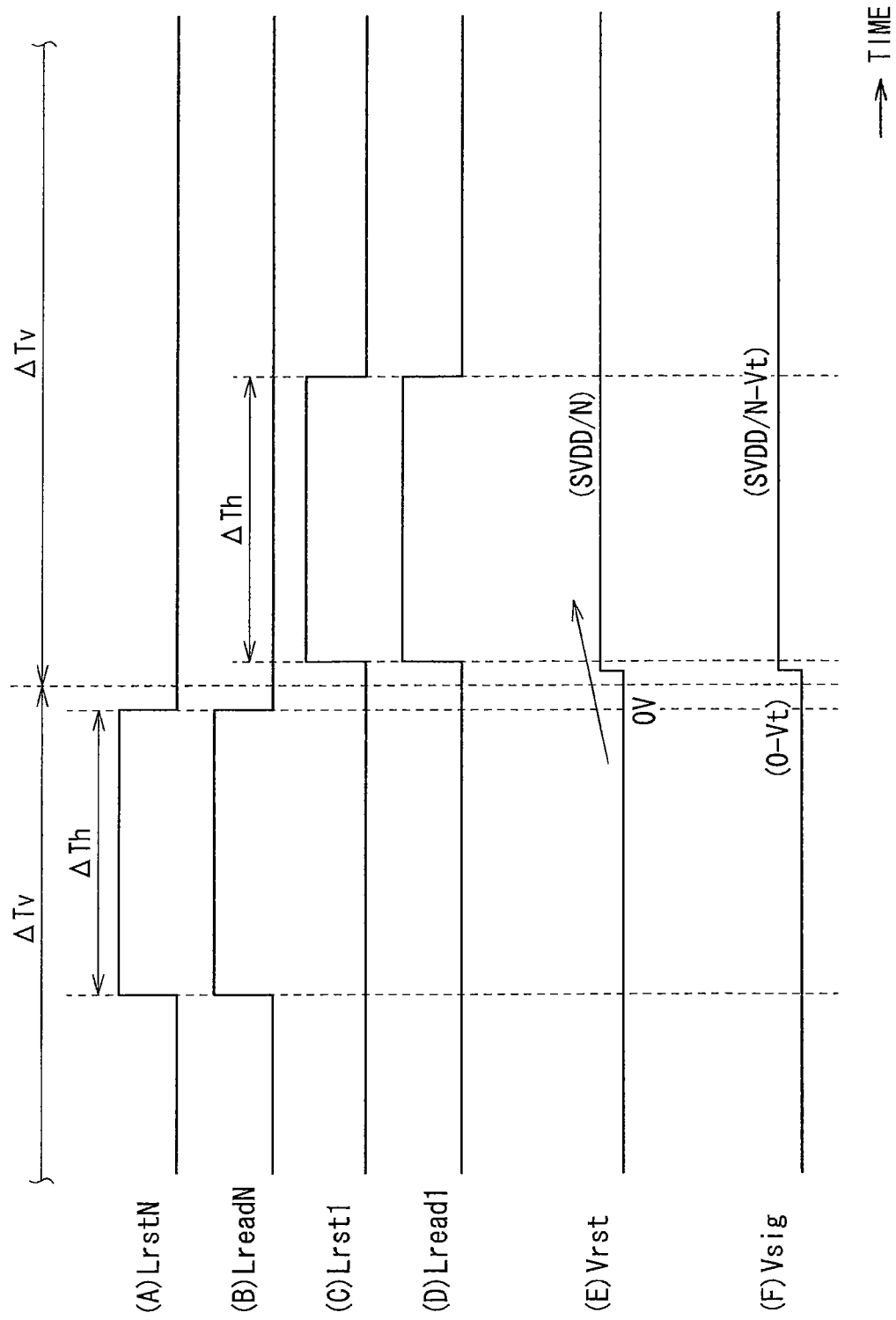
FIG. 9 is a diagram illustrating a second method of acquiring initial data and measurement data, in a timing waveform chart.

The voltage generation section 12 illustrated in FIG. 1 generates a voltage such as the voltage (the power source voltage SVDD) of the power source VDD or the reset voltage Vrst mentioned above, and supplies the generated voltage to each of the pixels 20 in the image pickup section 11. Here, at the time of acquiring initial data Dorg and measurement data Dm to be described later, this voltage generation section 12 changes the value of the reset voltage Vrst stepwise within a voltage range that the storage node N may have during imaging (for example, in a range of 0 volt to the power source voltage SVDD). A technique of changing the reset voltage Vrst stepwise when the initial data Dorg and the measurement data Dm are acquired will be described later in detail (FIG. 7 to FIG. 9).

The row scanning section 13 is configured by using, for example, a shift register, an address decoder, and the like, and is a pixel driving section that drives each of the pixels 20 in the image pickup section 11 row by row, for example. Such row-by-row driving is performed by supplying the reset signal and the row scanning signal described above, via the reset control line Lrst and the reading control line Lread described above, respectively.

As illustrated in FIG. 1, the A/D conversion section 14 has a plurality of (here, four) column selecting sections 17 each provided for every signal line Lsig, and performs AD conversion (analog-to-digital conversion) based on the signal voltage Vsig inputted via the signal line Lsig. As a result, digital-signal data (input data Din and the measurement data Dm to be described later) is generated and supplied to the correction section 18.

Figure 4:
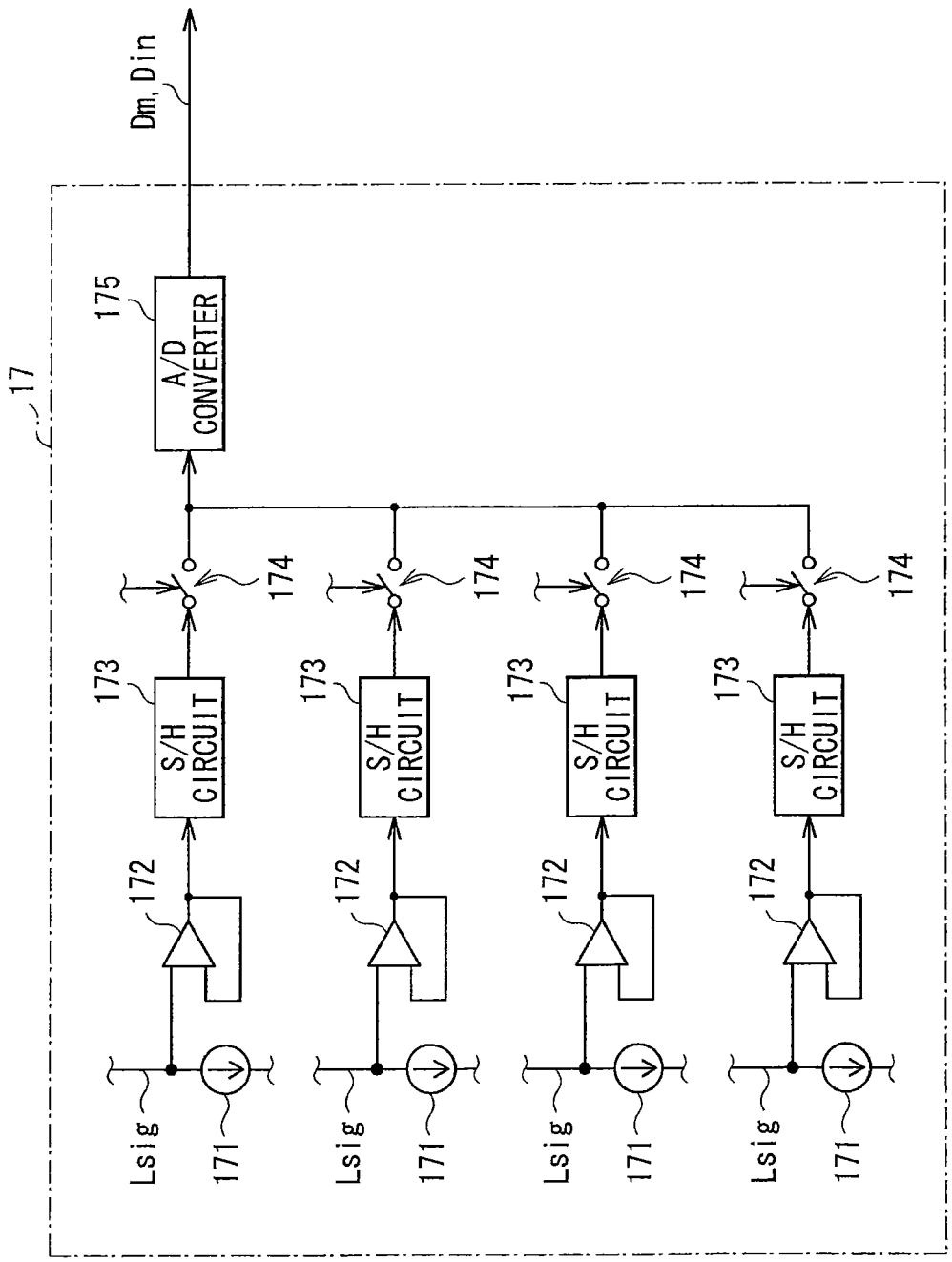
FIG. 4 is a diagram illustrating a detailed configuration of the column selecting section illustrated in FIG. 1.

As illustrated in, for example, FIG. 3 and FIG. 4, each of the column selecting sections 17 has the constant current source 171, an amplifier 172, a sample hold (S/H) circuit 173, a horizontal selection switch 174, and an A/D converter 175. Of these, the constant current source 171, the amplifier 172, the S/H circuit 173, and the horizontal selection switch 174 are provided for every signal line Lsig, as illustrated in FIG. 4. On the other hand, the A/D converter 175 is provided for each of the column selecting sections 17. The constant current source 171 is provided between one end of the signal line Lsig and a negative power source VSS as illustrated in FIG. 3. Of the amplifier 172, one input terminal is connected to one end of the signal line Lsig, and the other input terminal is connected to an output terminal. In other words, a voltage follower circuit is formed using this amplifier 172. The S/H circuit 173 is provided between the amplifier 172 and the horizontal selection switch 174, so as to temporarily maintain an output voltage from the amplifier 172. The horizontal selection switch 174 is a switch to make or break connection between each of the S/H circuits 173 and the A/D converter 175, according to scanning driving by the column scanning section 15. The A/D converter 175 subjects an output voltage supplied from the S/H circuit 173 and inputted via the horizontal selection switch 174 to AD conversion, thereby generating and outputting the input data Din or the measurement data Dm mentioned above.

The column scanning section 15 is configured by using, for example, a shift register, an address decoder, and the like, and sequentially scans and thereby drives each of the horizontal selection switches 174 in the column selecting section 17 described above. Through selection scanning by this column scanning section 15, the signal (the input data Din or the measurement data Dm mentioned above) of each of the pixels 20 transmitted via each of the signal lines Lsig is sequentially outputted and transmitted to the correction section 18.

The system control section 16 controls operation of the row scanning section 13, the A/D conversion section 14, and the column scanning section 15 described above. Specifically, this system control section 16 has a timing generator that generates various timing signals and performs control of driving the row scanning section 13, the A/D conversion section 14, and the column scanning section 15, based on the various timing signals generated in this timing generator.

(Correction Section 18)

The correction section 18 performs predetermined correction process (correction operation) on the input data Din (pre-correction data) supplied from the A/D conversion section 14, thereby outputting output data Dout (post-correction data). Specifically, the correction section 18 makes a comparison between the measurement data Dm and the initial data Dorg to be described below, and performs the correction process by the pixel 20 individually, by using a result of the comparison. This correction section 18 includes an initial-data holding section 180, a measurement-data holding section 181, a determination section 182, a correction-data generating section 183, an offset correction section 184, and a gain/linearity correction section 185.

The measurement-data holding section 181 is a section (memory) that holds (stores) the measurement data Dm supplied from the A/D conversion section 14. Although details will be described later, this measurement data Dm is data obtained by measuring an input-output characteristic of the source follower circuit in each of the pixels 20.

The initial-data holding section 180 is a section (memory) that holds (stores) the initial data Dorg (original data, or reference data) on the input-output characteristic of the source follower circuit in each of the pixels 20 beforehand.

The determination section 182 makes a comparison between the measurement data Dm held in the measurement-data holding section 181 and the initial data Dorg held in the initial-data holding section 180, and determines whether or not to carry out the following various kinds of correction process based on the result of the comparison.

The correction-data generating section 183 generates data (correction data) for the following various kinds of correction process by the pixel 20, based on the result of the comparison and a result of the determination (a result of determining whether or not to carry out the correction process) in the determination section 182. Specifically, when it is determined that offset correction should be carried out in the offset correction section 184, the correction-data generating section 183 acquires an offset amount of the input-output characteristic between the measurement data Dm and the initial data Dorg by the pixel 20 as the correction data. Further, when it is determined that gain correction should be carried out in the gain/linearity correction section 185, the correction-data generating section 183 acquires a gain error of the input-output characteristic between the measurement data Dm and the initial data Dorg by the pixel 20 as the correction data. Similarly, when it is determined that linearity correction should be carried out in the gain/linearity correction section 185, the correction-data generating section 183 acquires a linearity error of the input-output characteristic between the measurement data Dm and the initial data Dorg by the pixel 20 as the correction data. Details of such offset amount, gain error, and linearity error will be described later.

When it is determined in the determination section 182 that the offset correction should be carried out, the offset correction section 184 subjects the input data Din to the predetermined offset correction by the pixel 20 individually, by using the offset amount generated by the correction-data generating section 183. As a result, signal data D1 after such offset correction is generated. This offset correction will be described later in detail.

When it is determined in the determination section 182 that the gain correction should be carried out, the gain/linearity correction section 185 subjects the signal data D1 to the predetermined gain correction by the pixel 20 individually, by using the gain error generated by the correction-data generating section 183. Further, when it is determined in the determination section 182 that the linearity correction should be carried out, the gain/linearity correction section 185 subjects the signal data D1 to the predetermined linearity correction by the pixel 20 individually, by using the linearity error generated by the correction-data generating section 183. At the time, either the gain correction or the linearity correction may be carried out first. These gain correction and linearity correction will be described later in detail.

(Operation and Effect of Radiation Image Pickup Device 1)
(1. Basic Operation)

In the radiation image pickup device 1 of the present embodiment, when the radiation Rrad comes in as illustrated in FIG. 2, this radiation Rrad is converted into visible light in the wavelength conversion layer 112. At the photoelectric conversion layer 111 (the photoelectric conversion element 21 in each of the pixels 20 illustrated in FIG. 3), this visible light is converted (subjected to the photoelectric conversion) into signal charge. The charge produced by this photoelectric conversion causes a voltage change according to a storage node capacity in the storage node N. Specifically, when the storage node capacity is assumed to be "Cs" and the produced charge is assumed to be "q", a drop of (q/Cs) in voltage occurs at the storage node N. In response to such a voltage change, the input voltage Vin to the source follower circuit (the signal charge produced in the photoelectric conversion element 21) is applied to the gate of the transistor 23 of the source follower circuit.

In the source follower circuit, the transistor 23 outputs a signal voltage according to the signal charge described above. When the transistor 24 enters the ON state in response to the row scanning signal supplied from the reading control line Lread, the signal outputted from this transistor 23 is outputted (read out) as the signal voltage Vsig (the output voltage Vout from the source follower circuit) to the signal line Lsig.

The signal (the signal voltage Vsig) read out in this way is inputted into the column selecting section 17 in the A/D conversion section 14 for every plurality of (here, four) pixel columns via the signal lines Lsig. In the column selecting section 17, the AD conversion is performed for every signal voltage Vsig inputted via each of the signal lines Lsig, and digital-signal data (the input data Din and the measurement data Dm) is generated. In this way, the input data Din or the measurement data Dm is outputted from each of the column selecting sections 17 sequentially and transmitted to the correction section 18.

(2. As to Operating Point Shift of Transistor by Application of Radiation)

In this way, reading (imaging) of the information based on the radiation Rrad is carried out in the radiation image pickup device 1. However, a crystal defect occurs in the element in each of the pixels 20 by application of this radiation Rrad. Specifically, in the semiconductor layer of the transistor (for example, the transistor 23) in each of the pixels 20 and near an interface between the semiconductor layer and a gate insulating film or an interlayer insulating film, a crystal defect occurs, or electric charge is injected into the gate insulating film. When such crystal defect or injection of electric charge into the insulator occurs, a threshold (Vt) of the transistor 23 or the like fluctuates, or the mobility μ deteriorates. As a result, the operating point of the transistor 23 or the like changes (shifts), and variations in terms of the characteristic of the transistor 23 or the like (variations among the pixels 20) take place.

Figure 5A:
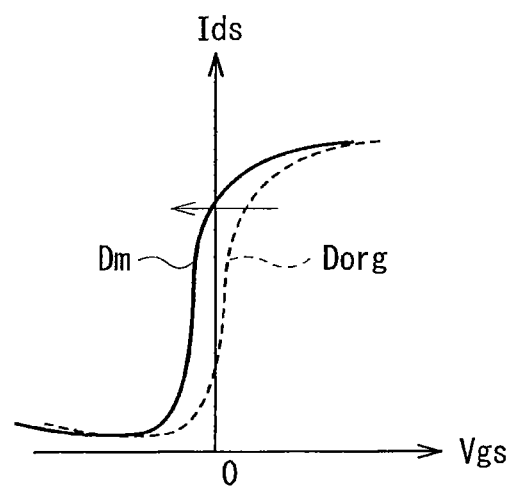
FIGS. 5A and 5B are characteristic diagrams for explaining a negative shift of an operating point of a transistor due to application of radiation.
Figure 5B:
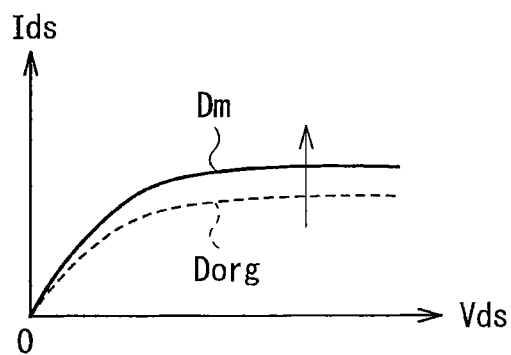

Specifically, as illustrated in, for example, FIGS. 5A and 5B, occurrence of a lattice defect by the application of the radiation Rrad causes the threshold (Vt) of the transistor 23 or the like to fluctuate and as a result, the operating point of the transistor 23 or the like shifts to the negative side (see arrows in the figures). Specifically, at first, as illustrated in FIG. 5A (a characteristic indicating the relationship between a source-gate voltage Vgs and a source-drain current Ids), the operating point of the transistor 23 or the like shifts to the negative side in the current measurement data Dm, further than that in the initial data Dorg. As a result, as illustrated in FIG. 5B (a characteristic indicating the relationship between a source-drain voltage Vds and Ids), the electric current (Ids) flowing in the transistor 23 or the like in the current measurement data Dm increases more than that in the initial data Dorg.

Figure 6A:
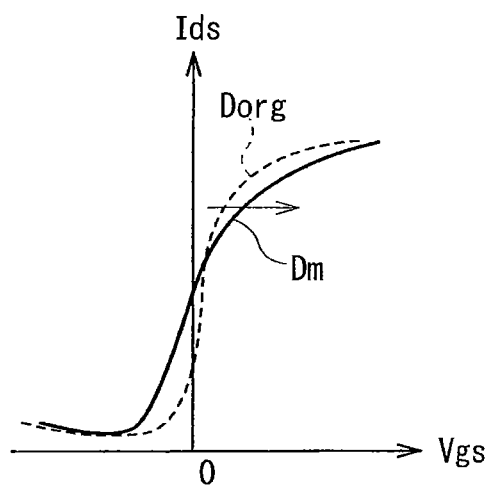
FIGS. 6A and 6B are characteristic diagrams for explaining a positive shift of an operating point of a transistor due to application of radiation.
Figure 6B:
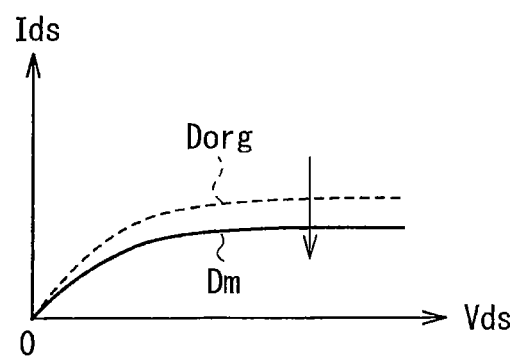

In addition, as illustrated in, for example, FIGS. 6A and 6B, the occurrence of the lattice defect by the application of the radiation Rrad causes the mobility ($\mu$) of the transistor 23 or the like to deteriorate and as a result, the operating point of the transistor 23 or the like shifts to the positive side (see arrows in the figures). Specifically, at first, as illustrated in FIG. 6A (a characteristic indicating the relationship between Vgs and Ids), the operating point of the transistor 23 or the like shifts to the positive side in the current measurement data Dm, further than that in the initial data Dorg. As a result, as illustrated in FIG. 6B (a characteristic indicating the relationship between Vds and Ids), the electric current (Ids) flowing in the transistor 23 or the like in the current measurement data Dm decreases more than that in the initial data Dorg.

In this way, when the characteristic (the operating point) of the transistor 23 or the like fluctuates, the input-output characteristic of the source follower circuit also changes (varies) accordingly. In that case, when left as it is, it is difficult to perform the accurate photoelectric conversion (imaging) of radiation corresponding to incident energy (degradation in information reading performance occurs).

(3. Correction Process of Signal Data)

Thus, in the present embodiment, the input data Din is subjected to the predetermined correction process (correction operation), and the output data Dout that is the post-correction data is generated, in the correction section 18. This correction process of the signal data Din by the correction section 18 will be described below in detail.

FIG. 7 illustrates an example of a method of correcting the input data Din by the correction section 18, in a flowchart.

(3-1. Acquisition and Holding of Initial Data and Measurement Data)

First, the initial data Dorg on the input-output characteristic of the source follower circuit is acquired beforehand (step S101), and the acquired initial data Dorg is held in the initial-data holding section 180 beforehand (step S102). It is to be noted that such acquisition of the initial data Dorg is performed beforehand at the time of shipment of a product (the radiation image pickup device 1), for example.

Next, the measurement data Dm at this point in time on the input-output characteristic of the source follower circuit is acquired as appropriate (at any time) (step S103), and the acquired measurement data Dm is held in the measurement-data holding section 181 as appropriate (at any time) (step S104). It is desirable to perform such acquisition of the measurement data Dm within a period during which the radiation Rrad does not enter in the image pickup section 11 (a period of no irradiation), for example. This makes it possible to perform measurement (monitoring) of a dark current.

Here, when such acquisition of the initial data Dorg and the measurement data Dm is performed, the value of the reset voltage Vrst is changed by the voltage generation section 12 stepwise within a voltage range that the storage node N may have during imaging (for example, in the range of 0 volt to the power source voltage SVDD). By measuring the output voltage Vout (the signal voltage Vsig) from the source follower circuit while thus changing the reset voltage Vrst stepwise, the input-output characteristic of the source follower circuit is acquired. As a technique of thus acquiring the initial data Dorg and the measurement data Dm, for example, there are three techniques which will be described below.

FIG. 8 illustrates a first technique, in a timing waveform chart. Of FIG. 8, Parts (A) and (C) illustrate voltage waveforms of reset control lines Lrst1 and Lrst2 in first and second rows (horizontal lines) in the image pickup section 11, respectively, and Parts (B) and (D) illustrate voltage waveforms of reading control lines Lread1 and Lread2 in the first and second rows, respectively. Further, Parts (E) and (F) illustrate voltage waveforms of the reset voltage Vrst and the signal voltage Vsig (the output voltage Vout), respectively. It is to be noted that a threshold voltage Vt illustrated in the figure indicates the threshold voltage in the source follower circuit, and also applies to the following.

In this first technique, the value of the reset voltage Vrst is changed stepwise within one horizontal period $\Delta$Th. Specifically, here, the value of the reset voltage Vrst is changed in six stages, in the range of 0 volt to the power source voltage SVDD. It is to be noted that when the linearity correction to be described later is performed, it is desirable to set such a reset voltage Vrst in three or more stages (set also to a voltage between 0 V and the power source voltage SVDD), but when the linearity correction is not performed, the reset voltage Vrst may be set in only two stages of 0 volt and the power source voltage SVDD. This also applies to second and third techniques which will be described below.

FIG. 9 illustrates the second technique, in a timing waveform chart. Of FIG. 9, Parts (A) and (C) illustrate voltage waveforms of reset control lines LrstN and Lrst1 in an Nth row (N: an integer of 2 or more) and a first row in the image pickup section 11, respectively, and Parts (B) and (D) illustrate voltage waveforms of reading control lines LreadN and Lread1 in the Nth row and the first row, respectively. Further, Parts (E) and (F) illustrate voltage waveforms of the reset voltage Vrst and the signal voltage Vsig (the output voltage Vout), respectively.

In this second technique, unlike the first technique, the value of the reset voltage Vrst is changed stepwise within one vertical period $\Delta$Tv. Specifically, here, within the range of 0 volt to the power source voltage SVDD, the value of the reset voltage Vrst is changed by one horizontal period $\Delta$Th to increase in (N+1) stage. In this way, the stepwise change of the value of the reset voltage Vrst may be carried out, for example, within one horizontal period $\Delta$Th, or within one vertical period $\Delta$Tv.

Figure 10:
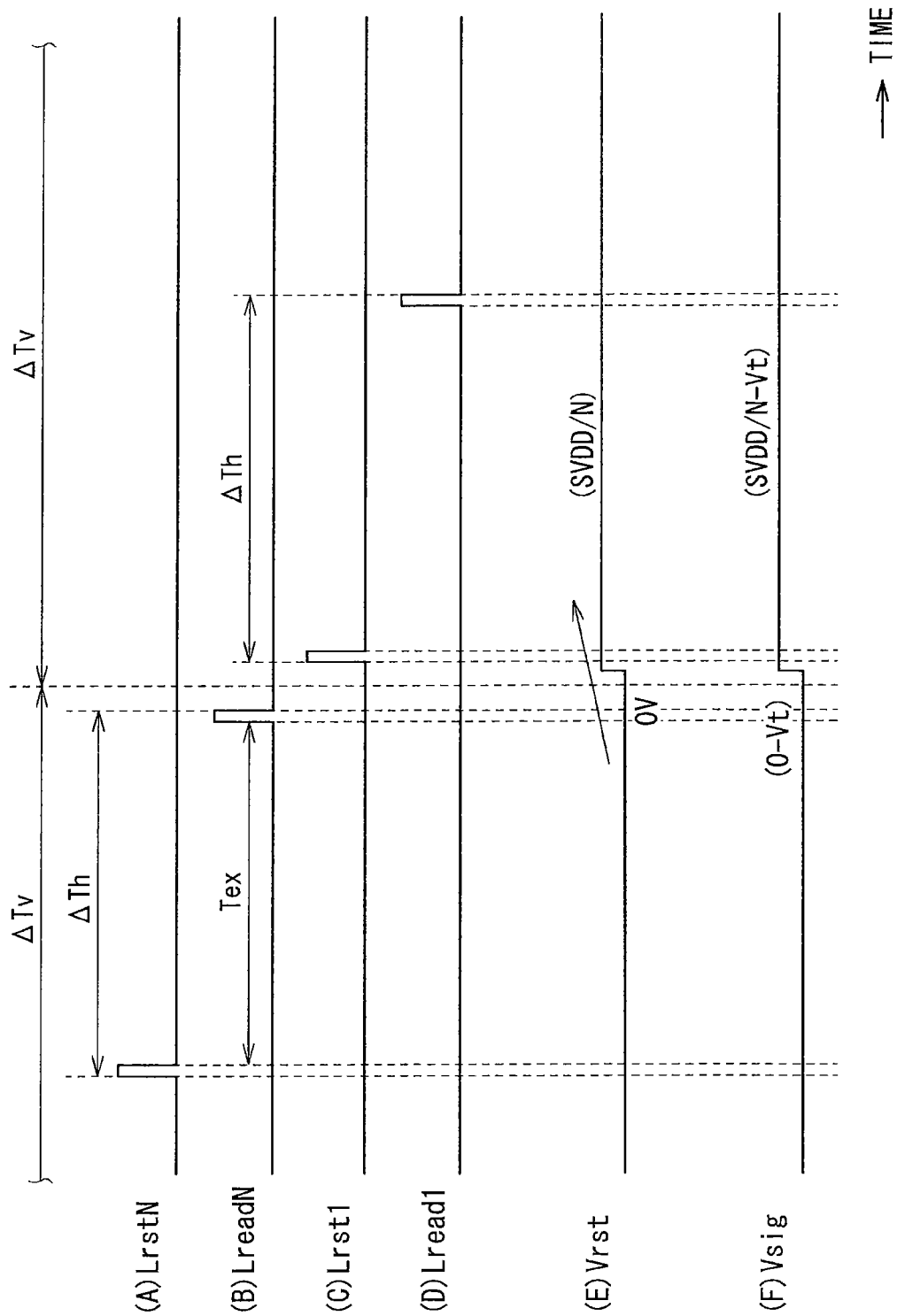
FIG. 10 is a diagram illustrating a third method of acquiring initial data and measurement data, in a timing waveform chart.

FIG. 10 illustrates the third technique, in a timing waveform chart. Of FIG. 10, Parts (A) and (C) illustrate voltage waveforms of reset control lines LrstN and Lrst1 in an Nth row and a first row in the image pickup section 11, respectively, and Parts (B) and (D) illustrate voltage waveforms of reading control lines LreadN and Lread1 in the Nth row and the first row, respectively. Further, Parts (E) and (F) illustrate voltage waveforms of the reset voltage Vrst and the signal voltage Vsig (the output voltage Vout), respectively.

In this third technique, like the second technique, the value of the reset voltage Vrst is changed stepwise within one vertical period $\Delta$Tv. Specifically, here, within the range of 0 volt to the power source voltage SVDD, the value of the reset voltage Vrst is changed by one horizontal period $\Delta$Th to increase in (N+1) stage. However, in this third technique, unlike the second technique, the signal voltage Vsig (the output voltage Vout) is measured after a lapse of a predetermined exposure period Tex starting upon completion of a period of applying the reset voltage Vrst. In other words, in the second technique, a period of applying the reset voltage Vrst and a period of reading the output voltage Vout agree with each other, but in the third technique, the exposure period Tex of a sufficient length is provided between a period of applying the reset voltage Vrst and a period of reading the output voltage Vout. This makes it possible in the third technique to also measure a dark current in addition to the input-output characteristic of the source follower circuit in the exposure period Tex and thus, correction process with higher accuracy is realized. It is to be noted that in contrast, according to the second technique, the period of applying the reset voltage Vrst and the period of reading the output voltage Vout agree with each other as described above and therefore, measurement of a dark current is not allowed.

(3-2. Comparison Between Initial Data and Measurement Data, and Generation of Correction Data)

Subsequently, the determination section 182 in the correction section 18 makes a comparison between the measurement data Dm held in the measurement-data holding section 181 and the initial data Dorg held in the initial-data holding section 180 (step S105). Then, based on a result of the comparison, the determination section 182 determines whether or not to carry out various kinds of correction process (offset correction, gain correction, and linearity correction) to be described below.

Figure 11A:
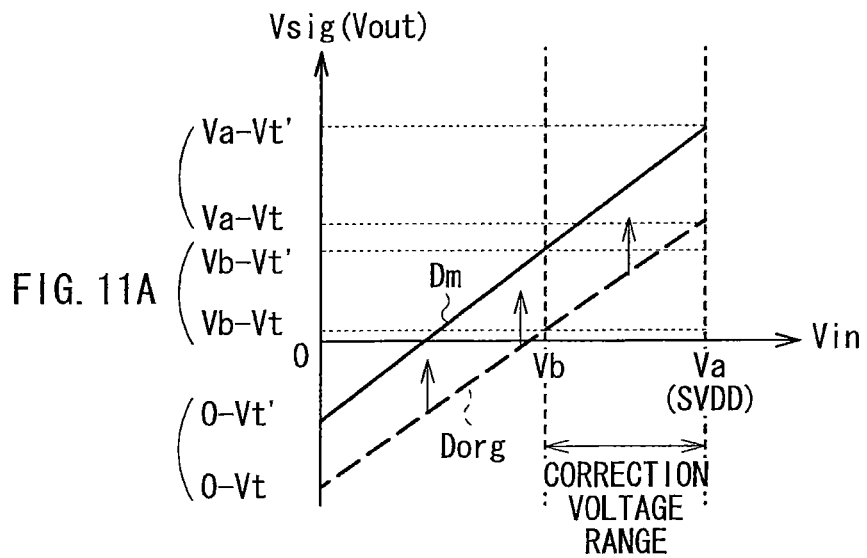
FIGS. 11A and 11B are characteristic diagrams for explaining a change in an input-output characteristic of a source follower circuit by the shift of the operating point of the transistor illustrated in each of FIGS. 5A and 5B and FIGS. 6A and 6B.
Figure 11B:
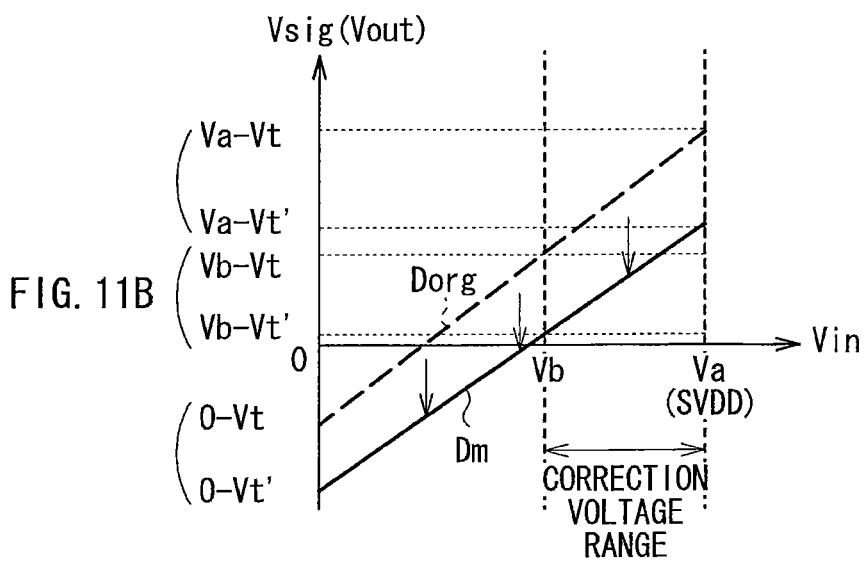

Specifically, for instance, in a case where the operating point of the transistor 23 or the like shifts like the input-output characteristic of the source follower circuit illustrated in FIGS. 11A and 11B (the characteristic indicating the relationship between the input voltage Vin and the output voltage Vout), which is taken as an example, determination is made in the following manner. FIG. 11A illustrates a case where the operating point of the transistor 23 or the like shifts in a negative direction, and FIG. 11B illustrates a case where the operating point of the transistor 23 or the like shifts in a positive direction (see arrows in the figures). In these figures, threshold voltages Vt and Vt' represent threshold voltages of the source follower circuit at the time of acquiring the initial data Dorg and at the time of acquiring the measurement data Dm, respectively. Further, a voltage range of the input voltage Vin=Va to Vb represents an example of the correction voltage range. In this way, usually, use of the entire voltage range of 0 volt to the power source voltage SVDD is considered to be rare and thus, an arbitrary voltage range may be set as the correction voltage range.

At this moment, when there is an offset amount of the input-output characteristic between the measurement data Dm and the initial data Dorg, the determination section 182 determines that the offset correction should be carried out in the offset correction section 184. However, usually, there is this offset amount at least and thus, it is determined that at least the offset correction should be carried out. This offset amount is, specifically, for example, equivalent to a differential value (|Vt'−Vt|) between the threshold voltages Vt and Vt' of the source follower circuit at the time of acquiring the initial data Dorg and at the time of acquiring the measurement data Dm, respectively.

In addition, when there is a gain error of the input-output characteristic between the measurement data Dm and the initial data Dorg, the determination section 182 determines that the gain correction should be carried out in the gain/linearity correction section 185. The gain (Gain) of the input-output characteristic is defined by a ratio (Gain=Vout/Vin) between the output voltage Vout and the input voltage Vin. Therefore, an error of the value of (Vout/Vin) between the measurement data Dm and the initial data Dorg corresponds to the gain error described here.

Further, when there is a linearity error of the input-output characteristic between the measurement data Dm and the initial data Dorg, the determination section 182 determines that the linearity correction should be carried out in the gain/linearity correction section 185. Here, given that the input-output characteristic of the initial data Dorg indicates linearity (a characteristic line is a straight line), a gap (an error) in the input-output characteristic of the measurement data Dm with respect to the linearity in the input-output characteristic of the initial data Dorg corresponds to the linearity error described here.

Subsequently, based on the result of the comparison and the result of determination in the determination section 182 as described above (the result of determining whether or not to carry out the correction process), the correction-data generating section 183 generates the correction data for the following various kinds of correction process by the pixel 20 (step S106). Specifically, when it is determined that the offset correction should be carried out in the offset correction section 184, the correction-data generating section 183 acquires the offset amount of the input-output characteristic described above by the pixel 20 as the correction data. Further, when it is determined that the gain correction will be carried out in the gain/linearity correction section 185, the correction-data generating section 183 acquires the gain error of the input-output characteristic described above by the pixel 20 as the correction data. Similarly, when it is determined that the linearity correction should be carried out in the gain/linearity correction section 185, the correction-data generating section 183 acquires the linearity error of the input-output characteristic described above by the pixel 20 as the correction data.

(3-3. Offset Correction, Gain Correction, Linearity Correction)

Next, when it is determined in the determination section 182 that the offset correction should be carried out, the offset correction section 184 subjects the input data Din to the offset correction by the pixel 20 individually, by using the offset amount generated in the manner described above (step S107). As a result, the signal data D1 after such offset correction is generated.

Subsequently, when there is the gain error or the linearity error described above (when it is determined in the determination section 182 that the gain correction or the linearity correction should be carried out) (step S108: Y), the gain/linearity correction section 185 subjects the signal data D1 to the gain correction or the linearity correction (step S109). Specifically, when it is determined in the determination section 182 that the gain correction should be carried out, the gain/linearity correction section 185 subjects the signal data D1 to the gain correction by the pixel 20 individually, by using the gain error generated by the correction-data generating section 183. Further, when it is determined in the determination section 182 that the linearity correction should be carried out, the gain/linearity correction section 185 subjects the signal data D1 to the linearity correction by the pixel 20 individually, by using the linearity error generated by the correction-data generating section 183. At this time, as described above, either the gain correction or the linearity correction may be performed first. It is to be noted that afterwards, the flow proceeds to step S110 that will be described below.

On the other hand, when there is neither the gain error nor the linearity error described above (when it is not determined in the determination section 182 that the gain correction and the linearity correction should be carried out) (step S108: N), the gain/linearity correction section 185 performs neither the gain correction nor the linearity correction. In other words, the flow directly proceeds to step S110 that will be described below.

Finally, signal data after being subjected to such correction process is outputted as the output data Dout from the correction section 18 to the outside (step S110). This completes the correction process illustrated in FIG. 7.

Figure 12:
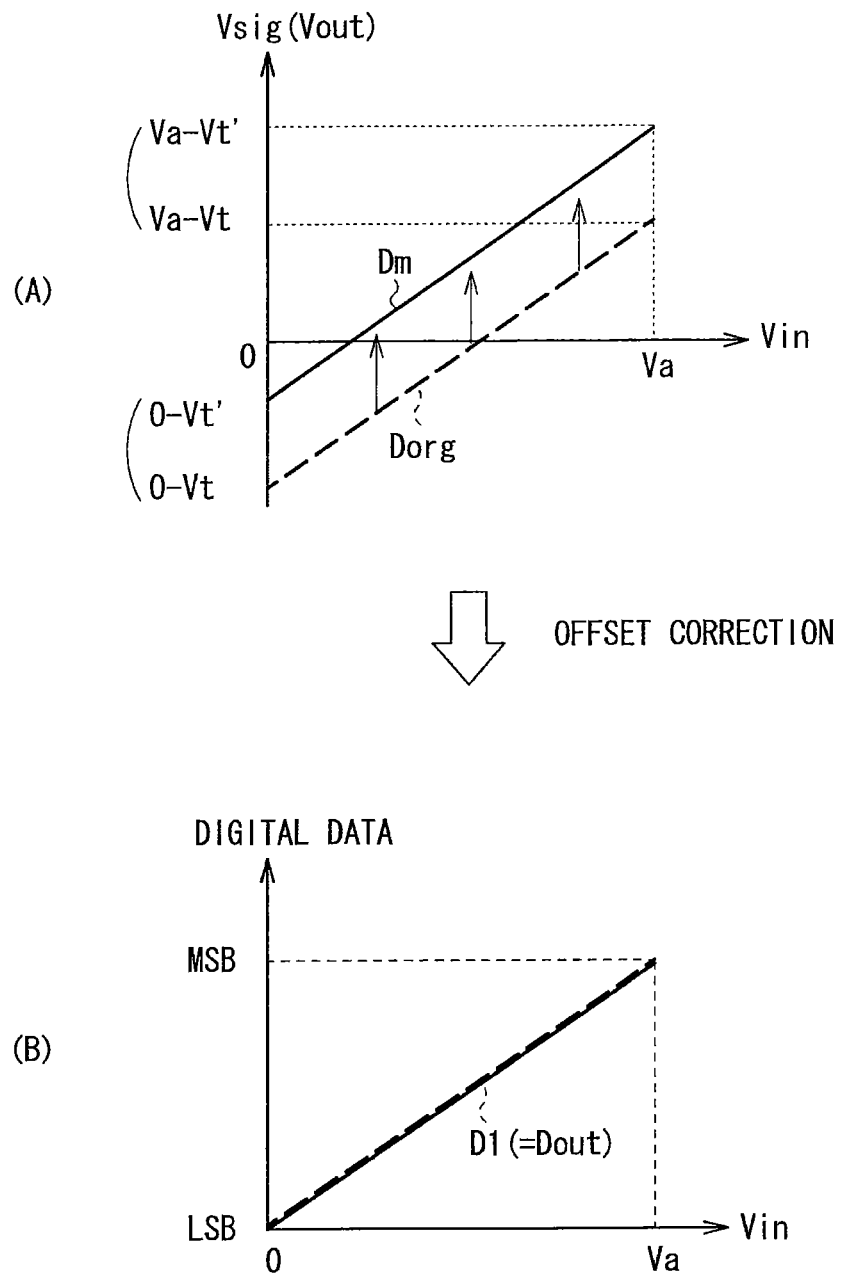
FIG. 12 is a characteristic diagrams illustrating an example of offset correction of signal data.
Figure 13:
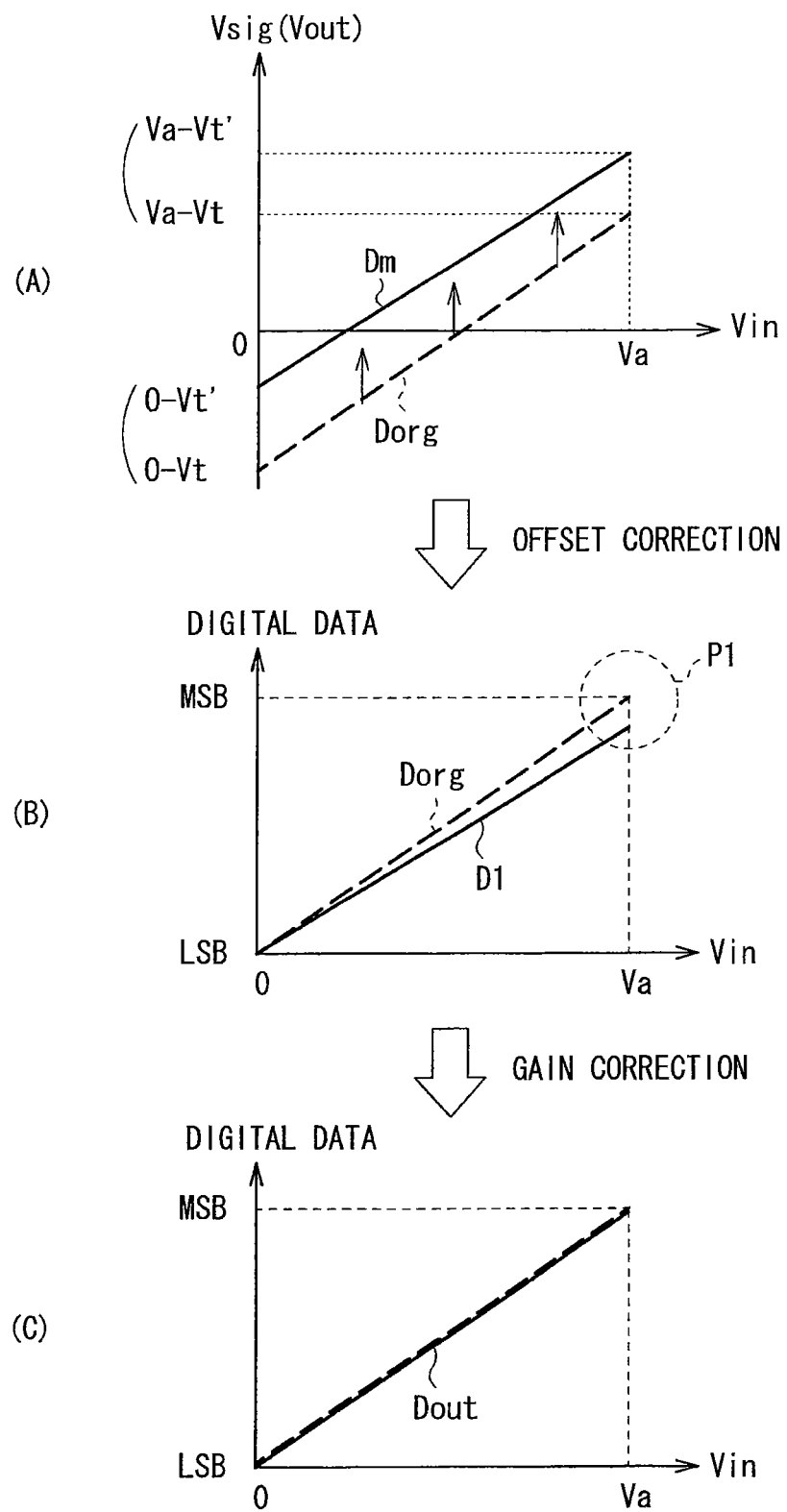
FIG. 13 is a characteristic diagram illustrating an example of offset correction and gain correction of signal data.
Figure 14:
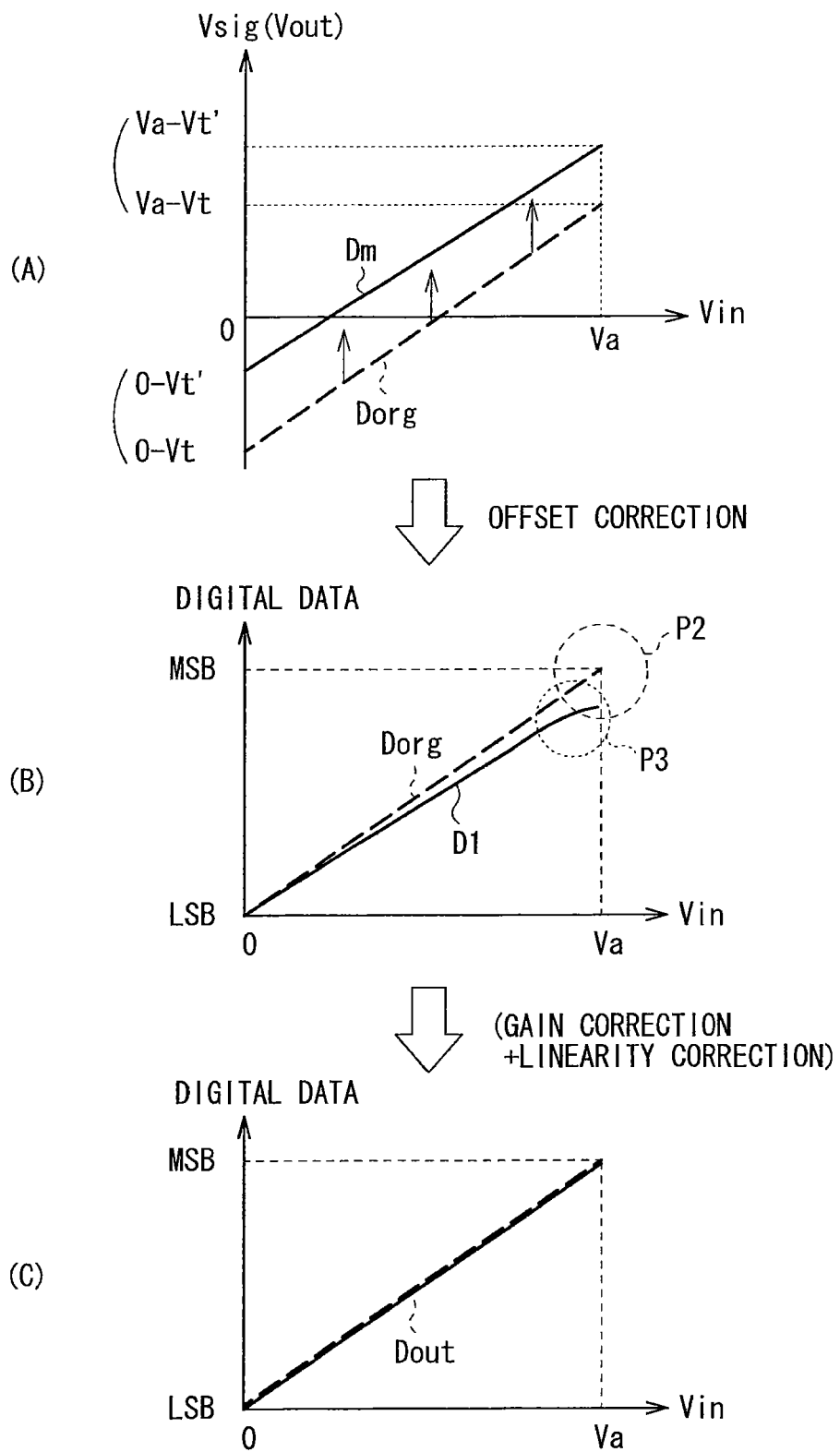
FIG. 14 is a characteristic diagram illustrating an example of offset correction, gain correction, and linearity correction of signal data.

Here, each of FIG. 12 to FIG. 14 illustrates the method of correcting the signal data Din according to the present embodiment specifically, and is an example of the correction process in a case where the operating point of the transistor 23 or the like shifts to the minus direction, like FIG. 11A described above, for instance. The offset correction, the gain correction, and the linearity correction will be described below with reference to these figures. It is to be noted that in these figures, digital data on a vertical axis corresponds to the signal data after the AD conversion, and a minimum value and a maximum value are indicated as LSB (Least Significant Bit) and MSB (Most Significant Bit), respectively.

First, in the example illustrated in FIG. 12, between the measurement data Dm and the initial data Dorg, there is only the offset amount of the input-output characteristic, and there is neither the gain error nor the linearity error, as illustrated in Part (A) of FIG. 12. Therefore, here, the offset correction section 184 subjects the input data Din to the offset correction by the pixel 20 individually, by using the correction data generated by the correction-data generating section 183. As a result, the signal data D1 after such offset correction is generated and outputted as the output data Dout, as illustrated in Part (B) of FIG. 12.

Next, in the example illustrated in FIG. 13, between the measurement data Dm and the initial data Dorg, there is the offset amount of the input-output characteristic as illustrated in Part (A) of FIG. 13 at first. Therefore, first, the offset correction section 184 subjects the input data Din to the offset correction by the pixel 20 individually. As a result, the signal data D1 after such offset correction is generated as illustrated in Part (B) of FIG. 13. Here, as indicated by a sign P1 in the Part (B) of FIG. 13, between this signal data D1 and the initial data Dorg, there is the gain error of the input-output characteristic. It is to be note that in this example, there is no linearity error between the signal data D1 and the initial data Dorg. Thus, subsequently, the gain/linearity correction section 185 subjects the signal data D1 to the gain correction by the pixel 20 individually, by using the correction data generated by the correction-data generating section 183. As a result, as illustrated in Part (C) of FIG. 13, signal data (the output data Dout) after such gain correction is generated and outputted.

Next, in the example illustrated in FIG. 14, between the measurement data Dm and the initial data Dorg, there is the offset amount of the input-output characteristic as illustrated in Part (A) of FIG. 14 at first. Therefore, first, the offset correction section 184 subjects the input data Din to the offset correction by the pixel 20 individually. As a result, the signal data D1 after such offset correction is generated as illustrated in Part (B) of FIG. 14. Here, as indicated by signs P2 and P3 in this Part (B) of FIG. 14, between this signal data D1 and the initial data Dorg, there are both the gain error (sign P2) and the linearity error (sign P3) of the input-output characteristic. Thus, subsequently, the gain/linearity correction section 185 subjects the signal data D1 to each of the gain correction and the linearity correction by the pixel 20 individually, by using the correction data generated by the correction-data generating section 183. As a result, as illustrated in Part (C) of FIG. 14, signal data (the output data Dout) after such gain correction and linearity correction is generated and outputted.

In the present embodiment, as described above, in the correction section 18, the comparison is made between the measurement data Dm obtained by measuring the input-output characteristic of the source follower circuit in each of the pixels 20 and the initial data Dorg on this input-output characteristic, and the signal data (the input data Din) of the electric signal generated according to the incident radiation Rrad is subjected to the correction process by using the result of the comparison. As a result, even when a characteristic change of the transistor 23 or the like in the pixel 20 occurs due to the application of the radiation Rrad, it possible to suppress a fluctuation in the input-output characteristic of the source follower circuit occurring in response to such a characteristic change. Further, the correction section 18 performs such correction process by the pixel 20 individually. This makes it possible to also address, for example, a partial (local) change in the input-output characteristic in the image pickup section 11, and suppress the fluctuation in the input-output characteristic of the source follower circuit more accurately. Therefore, for example, irregularities in reading the radiation Rrad among the pixels 20 may be reduced, making it possible to suppress degradation in information reading performance caused by an element characteristic change in the pixel 20, effectively.

Further, it is possible to monitor the amount of a fluctuation in the input-output characteristic in the source follower circuit at any time and thus, its result may be used as a factor for determining when to carry out calibration (proofreading, or adjustment) of the system (the radiation image pickup device 1).

Modifications

The present technology has been described by using the embodiment, but the present technology is not limited to this embodiment, and may be variously modified.

Figure 15:
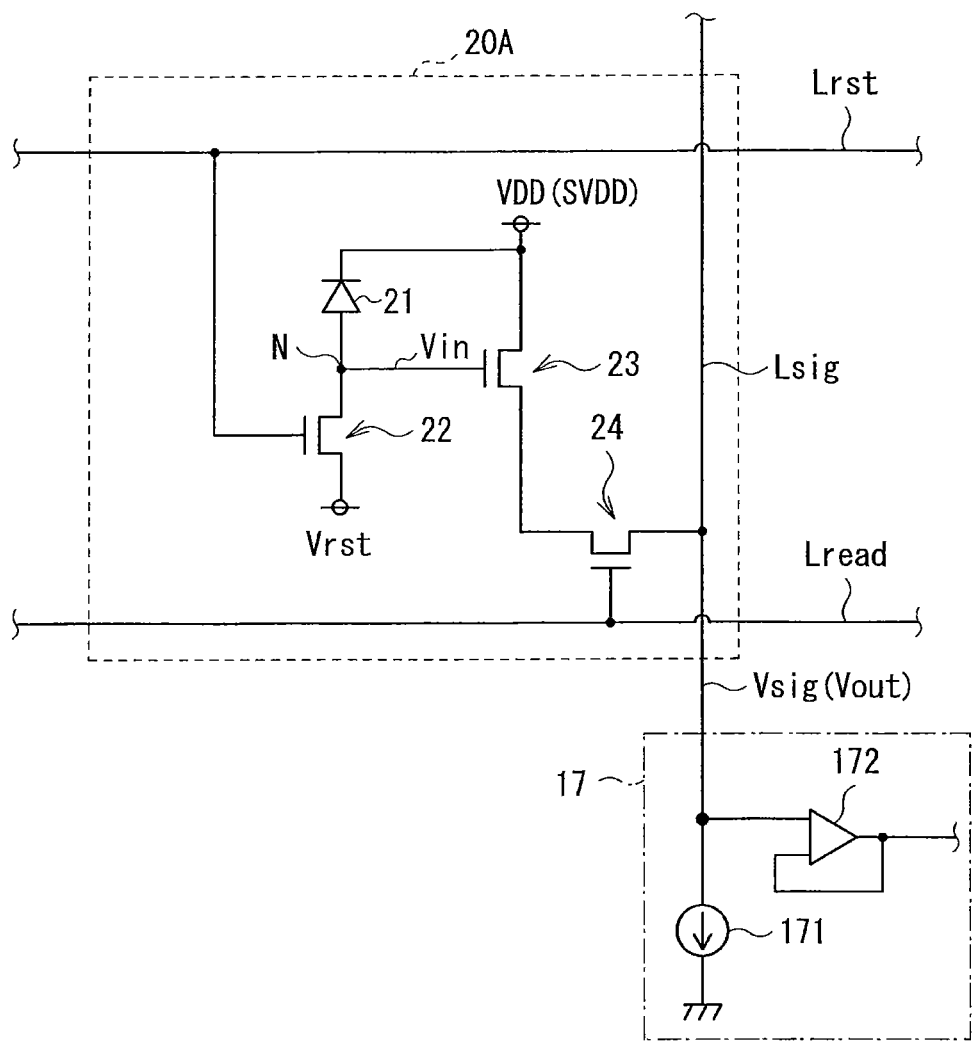
FIG. 15 is a circuit diagram illustrating a pixel configurational example according to a modification.

For example, the circuit structure of the pixel in the image pickup section 11 is not limited to the embodiment described above (the circuit structure of the pixel 20), and may be other circuit structure. In other words, like a pixel 20A illustrated in FIG. 15, for example, an anode of a photoelectric conversion element 21 may be connected to a storage node N, and a cathode may be connected to a power source VDD.

Further, the range of setting the reset voltage Vrst or the number of set values at the time of acquiring the initial data Dorg and the measurement data Dm are arbitrary, and not limited to those in the embodiment described above.

Furthermore, the embodiment has been described above for the case where the correction section performs the correction process by the pixel 20 individually (pixel by pixel), but such correction process may be performed for every two or more pixels.

The radiation image pickup device according to the embodiment of the present disclosure is applicable to, for example, medical equipment (X-ray image pickup devices such as Digital Radiography), belongings inspection X-ray image pickup devices used at airports, industrial X-ray image pickup devices (for example, devices for inspection of dangerous objects and the like in containers, and devices for inspection of the contents in bags and the like), etc.

The present disclosure contains subject matter related to that disclosed in Japanese Priority Patent Application JP 2010-188100 filed in the Japan Patent Office on Aug. 25, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed:

1. A photo-electronic conversion device comprising:
an image pickup section including a plurality of pixels and configured to generate an electric signal according to incident light, the image pickup section including a photoelectric conversion element and an amplifier circuit; and
a correction section configured to subject signal data from an electric signal from the image pickup section to a correction process,
wherein the correction section makes a comparison for the plurality of pixels between measurement data obtained by measuring a characteristic of the amplifier circuit and a reference data on the characteristic of the amplifier circuit, and performs the correction process based on the comparison for the plurality of pixels,
wherein the correction section makes an individual comparison for each of the plurality of pixels, and performs the correction process individually for each of the plurality of pixels.

2. The photo-electronic conversion device according to claim 1, wherein the correction section performs
generation of correction data for at least one of the plurality of pixels based on the result of the comparison, and
the correction process by using the correction data.

3. The photo-electronic conversion device according to claim 2, wherein the correction section performs
determination of an offset amount of the characteristic between the measurement data and the reference data, as the correction data, and
offset correction as the correction process, by using the offset amount.

4. The photo-electronic conversion device according to claim 3, wherein the correction section performs
determination of a gain error of the characteristic between the measurement data and the reference data, as the correction data, and
gain correction as the correction process, by using the gain error.

5. The photo-electronic conversion device according to claim 4, wherein the correction section performs
determination of a linearity error of the characteristic between the measurement data and the reference data, as the correction data, and
linearity correction as the correction process, by using the linearity error.

6. The photo-electronic conversion device according to claim 1, wherein the measurement data is obtained by measuring an output voltage from the amplifier circuit, while gradually changing a reset voltage used in resetting an input voltage from the photoelectric conversion element to the amplifier circuit.

7. The photo-electronic conversion device according to claim 6, wherein the measurement data is obtained by measuring the characteristic, within a period without entering the light in the image pickup section.

8. The photo-electronic conversion device according to claim 7, wherein the measurement data is obtained by measuring the output voltage, after a lapse of a predetermined exposure period starting upon completion of a period of applying the reset voltage.

9. The photo-electronic conversion device according to claim 1, wherein the light is X-rays.

10. A photo-electronic conversion device comprising:
a generation section including at least one circuit, the generation section being configured to generate an electric signal according to incident light,
a correction section configured to subject signal data from the electric signal from the generation section to a correction process,
wherein the correction section makes a comparison between measurement data obtained by measuring a characteristic of the circuit and a reference data on the characteristic of the circuit, and performs the correction process based on the comparison, and
wherein the correction section makes an individual comparison for each of a plurality of pixels, and performs the correction process individually for each of the plurality of pixels.

11. The photo-electronic conversion device according to claim 10, wherein the correction section performs
generation of correction data for at least one of the plurality of pixels based on the result of the comparison, and
the correction process by using the correction data.

12. A radiation image pickup device comprising:
an image pickup section including a plurality of pixels and configured to generate an electric signal according to incident radiation, which includes a photoelectric conversion element and at least one circuit; and
a correction section subjecting signal data of the electric signal obtained in the image pickup section to a correction process,
wherein the correction section makes a comparison between measurement data obtained by measuring a characteristic of the circuit and a reference data on the characteristic of the circuit, and performs the correction process by using a result of the comparison, and
wherein the correction section makes an individual comparison for each of the plurality of pixels, and performs the correction process individually for each of the plurality of pixels.

13. A photo-electronic conversion apparatus comprising:
a system control section;
an image pickup section including a plurality of pixels and configured to generate an electric signal according to incident light, the image pickup section including a wavelength conversion element, a photoelectric conversion element and an amplifier circuit; and
a correction section configured to subject signal data from the electric signal from the image pickup section to a correction process based on an information from the system control section;
wherein the correction section makes a comparison for the plurality of pixels between measurement data obtained by measuring a characteristic of the amplifier circuit and a reference data on the characteristic of the amplifier circuit, and performs the correction process based on the comparison for the plurality of pixels, and
wherein the correction section makes an individual comparison for each of the plurality of pixels, and performs the correction process individually for each of the plurality of pixels.

14. A photo-electronic conversion apparatus comprising:
a system control section;
a generation section configured to generate an electric signal according to incident light;
a correction section configured to subject signal data from the electric signal from the generation section to a correction process based on an information from the system control section, wherein the correction section makes a comparison between measurement data obtained by measuring a characteristic of a circuit comprised in the generation section and a reference data on the characteristic of the circuit, and performs the correction process based on the comparison, and wherein the correction section makes an individual comparison for each of a plurality of pixels, and performs the correction process individually for each of the plurality of pixels.

15. A radiation image pickup apparatus comprising:

a system control section;

an image pickup section including a plurality of pixels and configured to generate an electric signal according to incident radiation, the image pickup section including a wavelength conversion element, a photoelectric conversion element and at least one circuit; and a correction section subjecting signal data of the electric signal obtained in the image pickup section to a correction process based on an information from the system control section, wherein the correction section makes a comparison between measurement data obtained by measuring a characteristic of the circuit and a reference data on the characteristic of the circuit, and performs the correction process by using a result of the comparison, and wherein the correction section makes an individual comparison for each of the plurality of pixels, and performs the correction process individually for each of the plurality of pixels.

16. A photo-electronic conversion system comprising:

a light generator;

a system control section;

an image pickup section including a plurality of pixels and configured to generate an electric signal according to incident light from the light generator, the image pickup section including a wavelength conversion element, a photoelectric conversion element and an amplifier circuit; and a correction section configured to subject signal data from the electric signal from the image pickup section to a correction process based on an information from the system control section;

wherein the correction section makes a comparison for the plurality of pixels between measurement data obtained by measuring a characteristic of the amplifier circuit and a reference data on the characteristic of the amplifier circuit, and performs the correction process based on the comparison for the plurality of pixels, and wherein the correction section makes an individual comparison for each of the plurality of pixels, and performs the correction process individually for each of the plurality of pixels.

17. A photo-electronic conversion system comprising:

a light generator;

a system control section;

a generation section configured to generate an electric signal according to incident light from the light generator;

a correction section configured to subject signal data from the electric signal from the generation section to a correction process based on an information from the system control section, wherein the correction section makes a comparison between measurement data obtained by measuring a characteristic of a circuit comprised in the generation section and a reference data on the characteristic of the circuit, and performs the correction process based on the comparison, and wherein the correction section makes an individual comparison for each of a plurality of pixels, and performs the correction process individually for each of the plurality of pixels.

18. A photo-electronic conversion system comprising:

a light generator;

a system control section;

an image pickup section including a plurality of pixels and configured to generate an electric signal according to incident radiation from the light generator, the image pickup section including a wavelength conversion element, a photoelectric conversion element and at least one circuit; and a correction section subjecting signal data of the electric signal obtained in the image pickup section to a correction process based on an information from the system control section, wherein the correction section makes a comparison between measurement data obtained by measuring a characteristic of the circuit and a reference data on the characteristic of the circuit, and performs the correction process by using a result of the comparison, and wherein the correction section makes an individual comparison for each of the plurality of pixels, and performs the correction process individually for each of the plurality of pixels.

* * * * *